Dec. 24, 1940.  C. G. STAELIN  2,225,667
APPARATUS FOR DRAWING GLASS FIBERS
Filed July 24, 1936
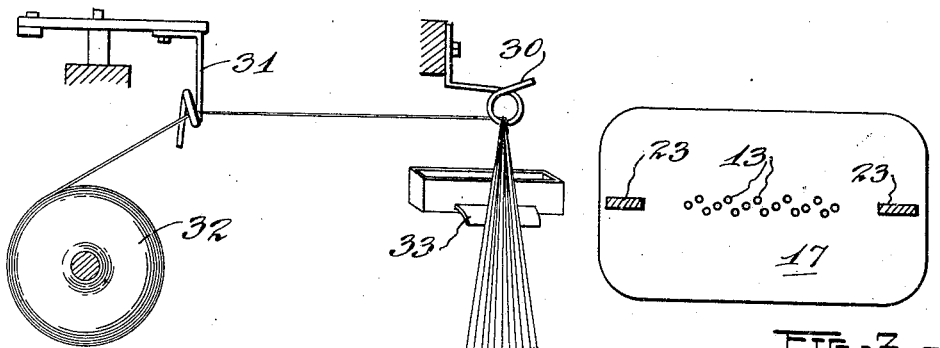
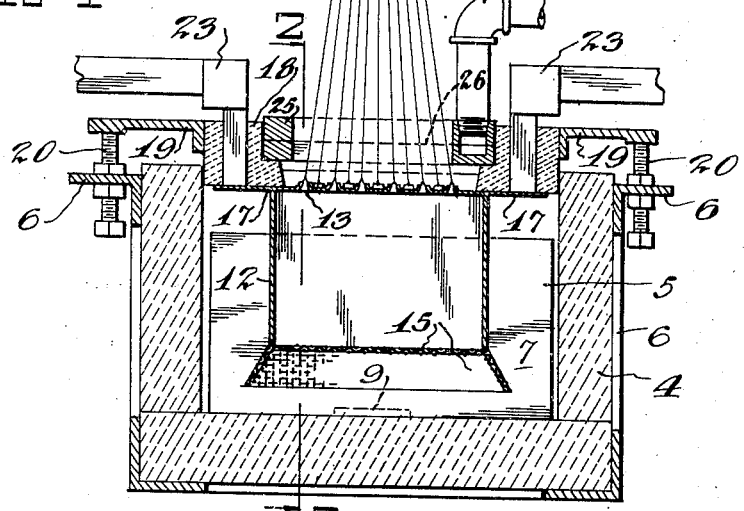
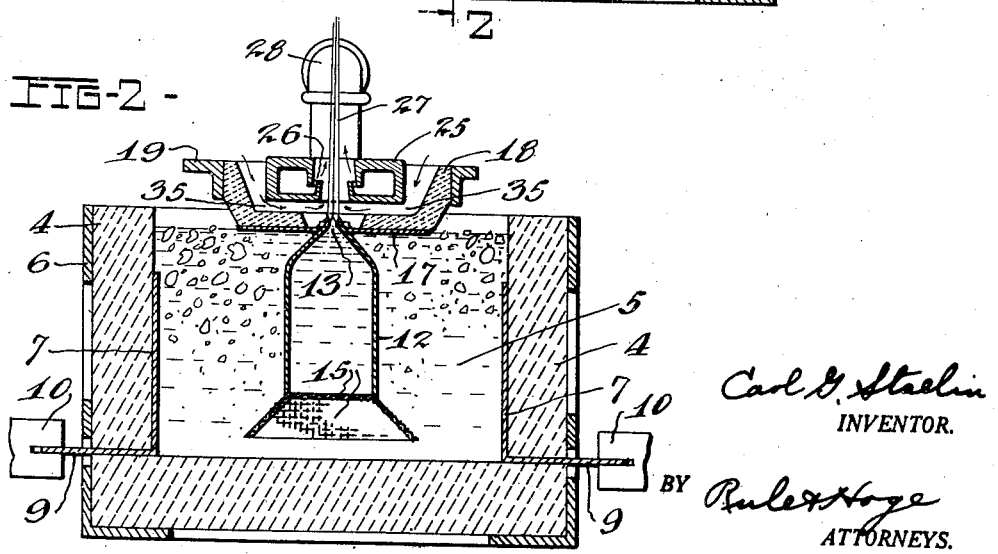
Carl G. Staelin
INVENTOR.
BY Rule & Hoge
ATTORNEYS.

Patented Dec. 24, 1940

2,225,667

UNITED STATES PATENT OFFICE 2,225,667

APPARATUS FOR DRAWING GLASS FIBERS

Carl G. Staelin, Toledo, Ohio, assignor, by mesne assignments, to Owens-Corning Fiberglas Corporation, Toledo, Ohio, a corporation of Delaware Application July 24, 1936, Serial No. 92,385

6 Claims. (Cl. 49—17)

The present invention relates to a novel apparatus for mechanically drawing glass fibers, and more particularly to an improved arrangement of apparatus for drawing exceedingly fine glass fibers. Heretofore it has been customary to flow glass downwardly through openings and mechanically draw the streams into fibrous glass. Methods heretofore in vogue have also contemplated the use of glass rods or the like from which glass fibers were drawn. These methods of operation had serious disadvantages in that the fineness of diameter size was limited and the diameters were not always constant and the drawing was not accomplished within a minimum drawing range.

It is an object of the present invention to provide apparatus for drawing glass into exceedingly fine fibers not known nor contemplated heretofore and to that end, I have found that it is desirable to increase the resistance to the pulling operation at or in the vicinity of the molten supply body of glass from which the fibers are drawn without unnecessarily increasing the viscosity of the glass itself.

Another object of the present invention is to confine the pulling operation to within as small a range as possible in which the temperature control may be accurately regulated.

Another object of the invention is to maintain the temperature of the supply body at a very high degree at which all the ingredients are thoroughly intermixed into a homogeneous solution and at which the glass may easily be drawn down to exceedingly great fineness, ranging as small or smaller than a few microns.

A further object of the present invention is to provide means for cooling the glass immediately as it is exposed at the supply body or as it issues therefrom, whereby the glass may be frozen into fiber form after it has been drawn down to proper thickness.

Other objects and advantages of the present invention will become apparent from the following description taken in conjunction with the drawing, in which:

Fig. 1 is a diagrammatic elevational view of my apparatus shown partly in section;

Fig. 2 is a cross-sectional view take along the line 2—2 of the apparatus shown in Fig. 1; and Fig. 3 is a fragmentary plan view showing the upper portions of the orifice openings shown in Figs. 1 and 2.

In the production of fine glass fibers by the mechanical drawing method, I have found it desirable to retain the drawing operation within as small a range as possible in which the fibers are permitted to neck down to their ultimate fineness and in which the temperature of the glass may be controlled and regulated within narrow limits; and to this end I have found it desirable to increase the resistance to the pulling action as much as possible. Heretofore, the customary methods of pulling glass fibers from a molten bath contemplated flowing the glass downwardly through openings but this method depended entirely upon the viscosity and surface tension of the glass itself to provide resistance to the pull which was vitiated to a certain extent by the gravity flow of the glass itself. I have found that it is possible to increase the resistance to the pull a substantial degree at the very place it is desired by drawing the fibers vertically upwardly. This method brings not only the viscosity and surface tension of the glass into play in resisting the pulling stresses but also gravity.

It is important, however, that a proper temperature control is maintained and in particular a cooling action applied so that the drawn fiber, which is still within the vicinity of the hot supply body, may instantly, upon its reduction to proper diameter, be frozen into its proper form. Without the correct cooling at this point, the glass may either continue to be attenuated until ultimately it is pulled to nothing, breaking the fiber, or it may lack sufficient resistance to pull the glass down to a fine fiber, in which case the fibers are coarse, relatively thick and brittle.

The apparatus used for carrying out my invention comprises in general a furnace adapted to supply a body of molten glass, means for exposing predetermined quantities of glass at the surface of the molten bath, means for mechanically drawing fibers from these exposed portions, and cooling means for regulating the temperature of the glass as it issues from these exposed portions.

If the temperature of the glass is lowered to increase the viscosity and resistance to the pull, the fibers are attenuated in an embrittling range, which seems to produce a weaker, more unsound fiber.

Referring more particularly to the drawing, reference character 4 designates a crucible in which is melted and contained a body of glass 5. This crucible 4 may be made of refractory ceramic material of suitable composition and may be supported by an outer shell or framework 6 or iron or the like. Lining opposite sides of the crucible are platinum or other suitable metal electrodes 7 adapted to melt the glass and maintain it at a proper temperature. Electric leads 9, preferably integral with the electrodes, extend outwardly from the crucible and are connected with electrical connections 10. In the center of the crucible is a melter 12, preferably of platinum, platinum alloy, or other suitable material, which is log-cabin in shape, being open at the bottom to admit the molten glass from the exterior thereof, and terminating at the top in a plurality of openings 13 at which the molten glass may be exposed. Screens 15 are preferably provided across and at the bottom of the melter 12 in order to prevent stones, unmelted batch and other foreign matter from entering into the melter. Across the surface of the glass and constructed preferably integral with the melter 12 is a surface plate 17 through which the openings 13 are extended.

The individual openings 13 are preferably provided with streamlined nipples, the inner contours of which are smoothly rounded to guide the glass smoothly over their surface and expose a regulated amount of glass with minimum turbulence or other disturbances. The openings 13 are preferably small in diameter so as to expose small portions of the molten glass. I found it desirable to provide nipple openings, which are about .030" to .100" in diameter, the exact size being chosen in accordance with the particular type and size fiber which is being attenuated.

Overlying the surface plate 17 is a refractory block 18 which serves to insulate the surface plate and also to hold the melter in position. Fastened to the refractory at opposite sides thereof are brackets 19 which are fastened by adjustable connections 20, comprising adjustable bolts and nuts or other suitable means which may be fastened to the outer casing of the framework 6. By regulating the connections 20, it is possible to adjust the heighth of the melter 12 and nipple openings 13 in relation to the surface of the body 5 of molten glass.

In order to maintain the temperature of the glass at the openings 13 within accurate limits, it has been found desirable to provide electric connections 23 at opposite ends of the surface plate 17. These electric connections 23 have been shown to project upwardly through the refractory block 18, but it is possible to introduce the electric connections to the melter 12 or surface plate 17 directly through the side walls of the crucible 4 by means of suitable fins or the like.

Spaced above the nipple openings 13 is a cooling means 25 which is preferably in the form of an air blower having nozzles or jets 26 directed upwardly along each side of the fibers 27. A conduit 28 may be provided to admit a predetermined quantity of gas at desirable temperatures and pressures to the nozzles 26.

The fibers 27 are drawn upwardly from the nipple openings 13 through an eye 30 which collects the fibers into a thread. After passing through the eye 30 the fibers are drawn through a traversing eye 31 and then wound on a revolving drum 32 which collects the fibers and winds them over a suitable spool or the like. It is preferable and desirable to coat the individual fibers with a suitable substance such as wax, oil, resin or other plastic substance immediately after formation and before they have had a chance to be exposed to the dirt and moisture of the atmosphere. For this purpose, coating applying means such as the pad 33 may be provided.

The operation of my device contemplates the introduction of glass batch or cullet into the exposed top of the crucible 4 in predetermined amounts commensurate with the rate of withdrawing glass in fiber form. The major portion of heat is admitted to the glass by means of the platinum electrodes 7. Electric currents of relatively high voltages for glass furnaces of the order of 50 to 100 volts or even higher according to the rate of withdrawing the glass from the openings 13, are admitted to the body of glass. While the majority of the heat is transmitted by and accordingly dissipated with the glass which has already been melted, nevertheless this heat is gradually diffused to the unmelted glass batch as it is fed into the bath 5. In view of the fact that unmelted glass batch does not convey electric current effectively, it is found to be advantageous, when starting the operation, to provide external heating means such as a burner or the like to initially melt the glass.

Once the operation has started, the electrodes can continue to melt the batch. As the glass is being melted, the gases and seeds tend to flow upwardly and escape to the atmosphere. The molten glass may then pass upwardly into the interior of the melter 12 where the glass is finally exposed at the nipple openings 13. In order to start the pulling operation, the melter is preferably lowered into the glass bath for a small distance by means of the connection 20, causing the glass to flow upwardly through the nipple openings and form a bead which may be picked up by a suitable bait and then drawn upwardly, passed through the eyes 30 and 31 and over the drum 32 to start the operation. Once started, the operation is continuous and produces fibers of indefinite length.

The temperatures of the molten bath involved in the present operation are preferably relatively high, ranging in the order of 2100° to 2400° F. The higher melting temperatures permit the ingredients to be thoroughly brought into solution and permit the glass to flow smoothly and uniformly into fiber form. After the glass has been drawn into a fiber, the jets 26 blow relatively cool air along the fibers and also induce cool air around the outside of the blower along the channels 35. This induced air impinges upon the glass as it is formed into fibers and freezes the glass almost immediately after it has been drawn down to the proper thickness. Without proper cooling, the glass cannot be issued at the high temperatures which produce uniformity and homogeneity and at which the glass flows smoothly and easily. Moreover, at lower temperatures the glass is more viscous, whereby attenuation and stressing in the high viscosity range cause a weakening of the fibers.

It is also desirable to retain the pulling operation within as narrow a range as possible. If the attenuation is carried over a long range, the fibers tend to become irregular, causing thick and thin spots in the glass. Furthermore, temperature regulation of the glass throughout the drawing range is made more difficult. If the temperature runs too cold at this time, the glass will not pull down to extremely fine fibers contemplated by the present invention, and if the glass is too hot over this long pulling range, it pulls down irregularly to extreme fineness and may actually be broken.

In order to retain the pulling operation within as narrow a field as possible, I have found that the vertical pulling upwardly has brought the factor of gravitation to bear in lending resistance to the pulling operation. The glass necks down and is pulled into a fiber within a very short range, actually within a small fraction of an inch of the nipple opening.

In order to permit the gravitational factor to bear more strongly in increasing the resistance to the pulling operation after the operation has been started, I have found that it is desirable to slightly raise the level of the melter 12 in relation to the surface of the molten glass. This may be done by adjusting the connections 20. If the melter 12 is lowered unduly below the level of the surface, the glass tends to jet out of the nipple openings at too high a rate, thus dissipating to a certain extent the beneficial gravitational effects at the pulling operation.

Modifications and variations may be resorted to within the spirit and scope of the appended claims.

I claim:

1. Apparatus for producing glass fibers which comprises a crucible for a molten supply body of glass, electrodes in said crucible contacting said supply body to introduce electrical energy into said glass and melt the same, a surface plate having openings therein exposing predetermined portions of said supply body to the atmosphere, means for drawing fibers upwardly from said exposed portions, and a blower mounted above and in proximity to said openings for supplying cooling gases to said glass as it is attenuated into fibrous form.

2. Apparatus for producing glass fibers which comprises a container for a molten supply body of glass, means for heating the glass within said container, nipples having openings at the upper surface of said glass body, means for raising and lowering said nipples with respect to said glass level to regulate the flow of glass through the nipples, means for regulating the temperature of said nipples and the glass therein to permit the glass to flow freely through said nipples, means for drawing fibers from said nipples, and means for accelerating the cooling of the glass as it issues from said nipples and becomes exposed to the atmosphere whereby the viscosity of the glass emerging from said nipples increases to an attenuable degree.

3. Apparatus for producing glass fibers which comprises a container for a molten supply body of glass, means for electrically heating the glass within said container, nipples having openings at the upper surface of said glass body, means for raising and lowering said nipples with respect to said glass level to regulate the flow of glass through the nipples, means for regulating the temperature of said nipples and the glass therein to permit the glass to flow freely through said nipples, means for drawing fibers from said nipples, and a blower arranged to induce cooling gases over said nipples and along the fibers as they are drawn from said supply body.

4. Apparatus for producing exceedingly fine glass fibers which comprises a tank for a body of molten glass, a melter mounted within said tank, said melter including an inverted container being open on the bottom to admit molten glass from the remaining portion of said tank and having small openings at the top thereof lying in proximity to the surface of the said body, said openings exposing areas of glass of predetermined size to the atmosphere, means for raising and lowering said container with respect to said tank to regulate the flow of glass through said openings, electrical means connected to said melter for maintaining the glass at the openings at a predetermined temperature, means for inducing cooling gases over the glass exposed at said openings in order to increase the viscosity thereof, and means for drawing fibers from said exposed portions.

5. Apparatus for producing exceedingly fine glass fibers which comprises a tank for a body of molten glass, a melter mounted within said tank, said melter including an inverted container being open on the bottom to admit molten glass from the remaining portion of said tank and having small openings at the top thereof lying in proximity to the surface of the said body, said openings exposing areas of glass of predetermined size to the atmosphere, means for raising and lowering said container with respect to said tank to regulate the flow of glass through said openings, electrical means connected to said melter for maintaining the glass at the openings at a predetermined temperature, means for drawing fibers from said exposed portions, and a blower spaced above said openings adapted to blow cooling gases upwardly along said fibers and induce atmospheric gases over said openings and the glass exposed thereat for cooling said glass as it is drawn into fibrous form whereby the glass is solidified while still within a fraction of an inch from said openings.

6. Apparatus for producing exceedingly fine glass fibers which comprises a tank for a body of molten glass, electrodes mounted in said tank for transmitting electrical energy to said glass for conversion into heat and causing fresh batch which is fed to said tank to be melted, a melter mounted within said tank, said melter including an inverted container being open on the bottom to admit molten glass from the remaining portion of said tank and having small openings at the top thereof lying in proximity to the surface of the said body, said openings exposing areas of glass of predetermined size to the atmosphere, means for raising and lowering said container with respect to said tank to regulate the flow of glass through said openings, electrical means connected to said melter for maintaining the glass at the openings at a predetermined temperature, means for drawing fibers from said exposed portions, and a blower mounted above said openings adapted to blow cooling gases upwardly along said fibers and induce cooling gases over said openings and to the glass exposed thereat.

CARL G. STAELIN.